US005705010A

United States Patent [19]
Larsen

[11] Patent Number: 5,705,010
[45] Date of Patent: Jan. 6, 1998

[54] MULTIPLE PANE INSULATING GLASS UNIT WITH INSULATIVE SPACER

[75] Inventor: James E. Larsen, Andover, Minn.

[73] Assignee: Cardinal IG Company, Minnetonka, Minn.

[21] Appl. No.: 482,257

[22] Filed: Jun. 7, 1995

Related U.S. Application Data

[62] Division of Ser. No. 853,785, Mar. 19, 1992, Pat. No. 5,439,716.

[51] Int. Cl.$^6$ .............................. C03C 27/00; B21D 35/00

[52] U.S. Cl. .............................. 156/196; 156/109; 29/17.2; 29/428; 29/469.5; 29/163; 72/369; 228/141.1

[58] Field of Search .............................. 428/34; 156/107, 156/109, 196, 218, 228, 145; 72/369, 48, 149, 216, 217, 367; 196/218, 228, 145; 228/141.1, 134; 29/17.1, 17.2, 428, 525, 469.5, DIG. 3

[56] References Cited

U.S. PATENT DOCUMENTS

| | | | |
|---|---|---|---|
| 2,684,266 | 7/1954 | Englehart | 52/172 |
| 2,708,774 | 5/1955 | Seelen | 428/34 |
| 3,921,359 | 11/1975 | Brichard et al. | 52/616 |
| 3,956,998 | 5/1976 | Bavetz | 110/1 A |
| 3,981,111 | 9/1976 | Berthagen | 52/171 |
| 4,057,945 | 11/1977 | Kessler | 52/172 |
| 4,080,482 | 3/1978 | Lacombe | 52/172 |
| 4,261,145 | 4/1981 | Bröcking | 52/172 |
| 4,400,338 | 8/1983 | Rundo | 264/171 |
| 4,431,691 | 2/1984 | Greenlee | 428/34 |
| 4,551,364 | 11/1985 | Davies | 428/34 |
| 4,576,841 | 3/1986 | Lingemann | 428/34 |
| 4,658,553 | 4/1987 | Shinagawa | 52/172 |
| 4,683,154 | 7/1987 | Benson et al. | 428/34 |
| 4,720,950 | 1/1988 | Bayer et al. | 52/172 |
| 4,780,164 | 10/1988 | Rueckheim et al. | 156/104 |
| 4,808,452 | 2/1989 | McShane | 52/171 |
| 4,815,245 | 3/1989 | Gartner | 52/171 |
| 4,831,799 | 5/1989 | Glover et al. | 52/172 |
| 4,835,130 | 5/1989 | Box | 502/62 |
| 4,835,926 | 6/1989 | King | 52/171 |
| 4,850,175 | 7/1989 | Berdan | 52/790 |
| 4,994,309 | 2/1991 | Reichert et al. | 428/34 |
| 4,998,392 | 3/1991 | Masserelli et al. | 52/208 |
| 5,106,663 | 4/1992 | Boy | 428/34 |
| 5,377,473 | 1/1995 | Narayan et al. | 52/790 |

FOREIGN PATENT DOCUMENTS

| | | |
|---|---|---|
| 0054251 | 5/1982 | European Pat. Off. . |
| 0223511 | 5/1987 | European Pat. Off. . |
| 0283689 | 2/1988 | European Pat. Off. . |
| 2582963 | 6/1985 | France . |
| 3231698 | 3/1984 | Germany . |
| 2064631 | 6/1981 | United Kingdom . |
| 2181799 | 4/1987 | United Kingdom . |
| 8402482 | 5/1984 | WIPO . |
| 8907495 | 8/1989 | WIPO . |

*Primary Examiner*—Donald Loney
*Attorney, Agent, or Firm*—Fredrikson & Byron, PA

[57] ABSTRACT

An insulating glass unit is shown comprising a pair of generally parallel, spaced-apart glass-panes and a spacer peripherally joining the glass panes to each other. The spacer is a tubular structure, and may include a particulate desiccant filling at least a section of the interior and conforming to the interior configuration thereof to contribute compressive strength to the spacer. The spacer desirably is made from stainless steel sheeting having a thickness not greater than about 0.005 inches. In a preferred embodiment, the spacer includes side walls sealed to the glass panes and an outer wall extending between the side walls and having a sealant free portion between the side walls that extends substantially completely about the periphery of the glass unit.

7 Claims, 5 Drawing Sheets

MULTIPLE PANE INSULATING GLASS UNIT WITH INSULATIVE SPACER

This is a divisional of application Ser. No. 07/853,785, filed Mar. 19, 1992 now U.S. Pat. No. 5,439,716.

FIELD OF THE INVENTION

The invention relates to multiple pane insulating glass units for use in windows and doors and which are particularly characterized by the peripheral spacers that are employed to support spaced panes of an insulating glass unit with respect to each other.

BACKGROUND OF THE INVENTION

Insulating glass units of the type commonly used in the fabrication of windows and doors comprise two or more spaced, parallel glass panes. The panes have confronting surfaces that are separated from one another by a peripheral spacer. One or more of the confronting surfaces maybe coated with metal oxides or other materials to improve thermals efficiency of the glass units. The spacers, which often are tubular lengths of metal, extend around the periphery of the glass panes and are sealed to confronting surfaces of the panes by means of relatively soft, adherent sealant ribbons.

From a structural standpoint, spacers must support pairs of glass panes with respect to one another against stresses resulting from positive or negative windload due to thunderstorms or major atmospheric disturbances and from temperature variations in the interpane space due to solar heat gains and weather effects. The organic sealant ribbons referred to above generally are the weakest structural elements of the spacers, and because of their resilient nature, they do not restrain glass panes from in-plane or bending movements. Spacers employing organic sealants thus provide "simply supported" boundary conditions for the individual panes. On the other hand, ceramic frit and other rigid spacers that have been suggested in the prior art provide a rigid support approaching "clamped" boundary conditions. The probability of failure of glass panes under clamped boundary conditions from windload-induced stresses typically is much higher than that resulting from simply supported boundary conditions, and multipane structures using clamped boundary conditions thus tend to require the use of thicker or tempered (and therefore more costly) glass panes.

Spacers, in addition to exhibiting sufficient strength to enable an insulating glass unit to withstand wind, pressure and temperature differentials, must additionally support the panes with respect to each other as the glass units are fabricated, loaded, transported and unloaded, and as they are handled while being fitted into suitable frame structures. The stresses to which spacers are subjected during transportation and fabrication steps can be substantially more severe than stresses resulting from wind loading, particularly with respect to compressive forces which tend to compress the respective glass panes toward one another and thus crush the spacers separating them.

Spacers also perform a sealing function; they seal the interpane space (the space between confronting pane surfaces) from the atmosphere. The interpane space commonly contains dry air or an inert gas of low thermal conductivity, such as argon, and it is important that the interpane space be kept substantially free of moisture (which may condense) and even minute quantities of other contaminants.

Spacers should be highly thermally insulative. The gas-filled interpane space offers excellent resistance to the flow of heat. The bulk of the heat flow adjacent the periphery of insulating glass units occurs through the spacer because it is much more conductive to heat than is the gas in the interpane space. As a result, during wintertime conditions, the temperature of the inner or roomside pane peripheral area (usually considered to be a 2½ inch wide strip around the periphery of the pane), especially near the bottom of the units, may fall below the dew point of air adjacent the roomside pane, causing undesirable condensation. The "sightline" (the distance from the edge of the glass pane to the inner edge of the spacer) should ideally be as small as possible to maximize the vision area, and sightline dimensions often are required to be less than ¾ inches or even less than ½ inches.

Thus, ideal spacers should provide simply supported (not clamped) boundary conditions to allow the glass panes to bend. Yet, the spacers should exhibit excellent insulating qualities and resistance to gas transmission. Finally, ideal spacers themselves should not unduly limit the viewing area.

Tubular metal spacers of the type described above generally have been made from aluminum by extrusion or metal bending processes, the hollow, elongated tubular spacers having generally flat opposed side walls which are adhered to confronting glass panes near their edges by means of adherent sealant ribbons. Spacers commonly are positioned inwardly slightly from the outer edges of the glass panes to define a trough or groove about the periphery of the insulated glass units; this periphery commonly is sealed with a sealant of silicone rubber or the like. The wall of the spacer that faces the interpane space may have grooves or slots through its thickness and may contain granules of a desiccant such as silica gel. In order to withstand the crushing loads to which spacers are subject during transportation and fabricating procedures, as described above, the tubular spacers commonly are made of relatively thick aluminum, e.g., aluminum having a thickness of 0.012 inches or more. Thick-walled aluminum spacers, however, readily transmit heat from one pane to the other and thus generally have poor insulating qualities. Tubular metal spacers can be made of stronger and less heat conductive materials, such as stainless steel, but even then the spacers must have thicknesses on the order of 0.009 inches or more in order to exhibit sufficient compressive strength to withstand shipping and handling stresses. As used herein, "compressive strength" refers to the resistance of a spacer to the crushing loads that act normal to the planes of the glass panes and which tend to crush the spacers between panes.

To reduce the severity of the problems referred to above, various spacer designs have been investigated. There is yet a substantial and unfilled need for a cost effective spacer which provides reliable structural support between pairs of glass panes, a small sightline, and which yet is highly insulative so as to resist the flow of heat through the spacer from one pane to the other.

SUMMARY OF THE INVENTION

The present invention provides insulating glass units having spacers which on the one hand are highly insulative but on the other hand have substantial structural resistance to wind loading stresses and also to the crushing stresses to which spacers are subjected during shipping and handling of the glass units. An insulating glass unit of the invention comprises a pair of generally parallel, spaced-apart glass panes (although three or more spaced-apart panes may be employed) and a spacer peripherally joining the glass panes to each other, the panes and spacer sealant assembly defining between them a gas-containing interpane space. The spacer comprises an elongated spacer length having a hollow interior and opposed, generally flat side walls, and a sealant sealing and adhering the side walls to opposed pane surfaces.

In one embodiment, the spacer includes a crush-resistant particulate desiccant, preferably comprising a spherical zeolite, that is carried within at least a section of the hollow spacer interior and that conforms to the interior configuration thereof to transmit compressive forces from one wall of the spacer to the other and to thereby contribute compressive strength—that is, crush resistance—to the spacer. Desirably, the elongated spacer length is of stainless steel having a wall thickness not greater than 0.005 inches and preferably in the range of 0.0035 to 0.005 inches, and the structural zeolite component increases crush resistance of the spacer (that is, the compressive stress causing plastic deformation of the spacer) by at least 30% and preferably in the range of 30% to 80%.

In another embodiment, the invention provides a method of forming a small radius corner bend in a straight length of a tubular spacer having deformable walls desirably formed of stainless steel having a wall thickness not greater than about 0.005 inches (preferably 0.0035 to 0.005 inches) and adapted for use in an insulating glass unit. The method comprises packing the interior of the straight portion with a particulate desiccant or other crush-resistant filling material, and then bending the spacer length into a right angle, the particulate filling material preventing the walls of the spacer from collapsing during the bending operation.

In another embodiment, the spacer, again desirably of stainless steel having a wall thickness of not greater than about 0.005 inches and preferably in the range of 0.0035 to 0.005 inches, comprises a first elongated portion that is generally U-shaped or W-shaped or has another pleated or sinuous shape in cross section, the legs of the shape forming generally flat side walls that are adhered to confronting pane surfaces. An elongated plate extends between, and has opposed edges attached to, the side walls to form an interior wall that defines, with the sinuous shaped portion, the hollow spacer interior, the elongated plate portion having crushing strength-imparting corrugations therein extending normal to the confronting surfaces of the glass panes. Desirably, the interior of the hollow spacer is filled with a crush-resistant particulate desiccant that conforms to the interior configuration thereof to transmit compressive forces from one wall of the spacer to the other and to thereby contribute compressive strength to the spacer.

In yet another embodiment, the hollow spacer includes an interior wall that extends between the side walls and that faces the interpane space, the interior wall having elongated portions thereof extending convergently from the respective side walls and having mutually overlapping edge portions joined together at points along their length to define a plurality of openings communicating the interior of the spacer with the interpane space. The spacer of this embodiment preferably is made of stainless steel having a wall thickness not greater than about 0.005 inches, the edge portions being joined together by weldments.

As indicated above, the stainless steel sheeting that is preferred for the manufacture of the spacers described herein may range in thickness from about 0.0035 inches to about 0.005 inches in thickness. Thicknesses on the order of 0.005 inches are most preferred.

BRIEF DESCRIPTION OF THE DRAWINGS

FIGS. 9(*b*) and (*c*) are broken-away, cross-sectional views showing modifications of the spacer of FIG. 9(*a*)

DETAILED DESCRIPTION OF THE PREFERRED EMBODIMENTS

Figure 1:
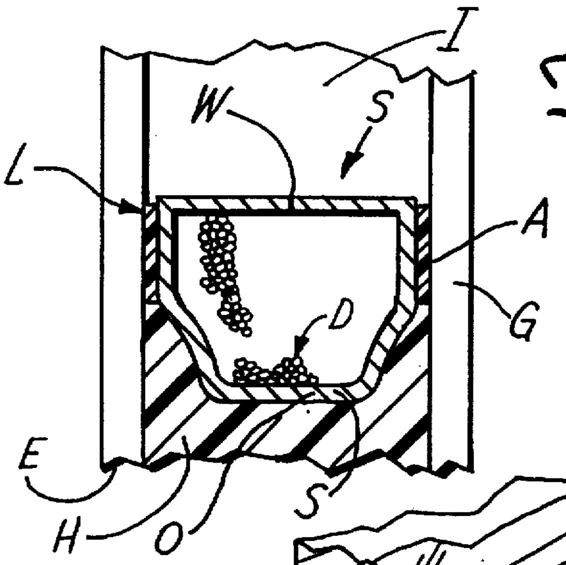
Fig. 1 PRIOR ART
FIG. 1 is a cross-sectional, broken-away view of a typical prior art insulating glass unit with spacer.

A glass unit of the prior art is shown in FIG. 1, with spaced, parallel glass panes being shown as G and a spacer of aluminum being shown as S. Confronting surfaces of the panes are sealed to the spacer by means of a sealant A. Disposed within the channel defined by the spacer S are loose granules of a desiccant D. The spacer S is generally tubular in shape, with edges of the spacer being butt-welded together at W along the center of the inner wall. Tiny perforations (not shown) are formed in the inner wall to permit gas in the interpane space I to come into contact with the desiccant. Another sealant H, which may be a silicone rubber, is disposed in the space defined by the outer wall O of the spacer and the confronting surfaces of the glass panes adjacent their peripheral edges, and provides another thermal path through which heat may be conducted from one pane to the other.

Figure 2:
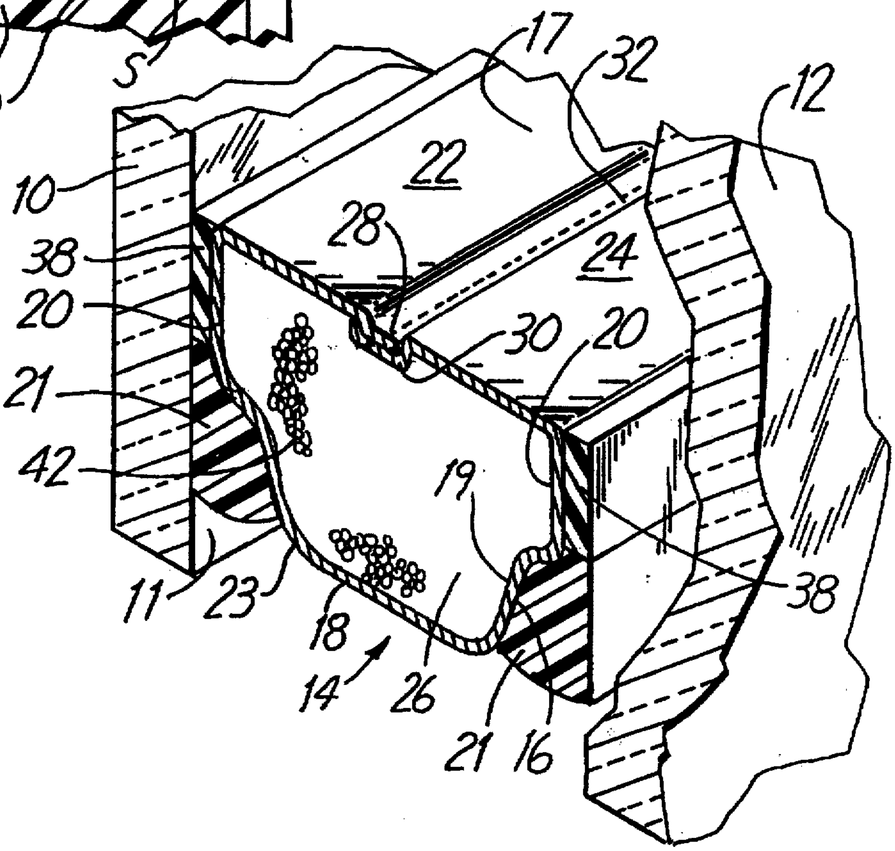
FIG. 2 is a perspective, broken-away view of an insulating glass unit of the invention showing a particular spacer configuration.
Figure 3:
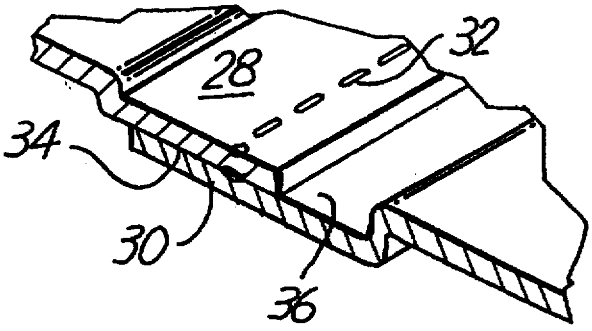
FIG. 3 is a perspective, broken-away view of a portion of the spacer of FIG. 2.

Referring now to FIGS. 2 and 3, an embodiment of the invention is depicted as comprising a pair of parallel, spaced glass panes represented by numerals 10 and 12, between which is sandwiched a spacer designated generally as 14. The spacer comprises a generally tubular thin walled structure 16, this structure in the embodiment of FIGS. 2 and 3 being formed from a single sheet of stainless steel or the like having a thickness not greater than about 0.005 inches. The stainless steel tubular structure 16 may be formed by rolling or other forming processes, and is provided with an outer wall 18 and parallel, opposed flat side walls 20 which, at their edges, are bent toward one another across the space separating the glass panes to form portions 22, 24 of the interior spacer wall 17 that face the interpane space. The interior wall portions 22, 24 have flat, overlapping edge portions 28, 30, respectively, which portions may be depressed slightly toward the interior of the spacer from the plane of portions 22, 24, as shown best in FIG. 3. Confronting surfaces of these overlapping portions are welded together, as by known laser welding techniques, at positions spaced from one another along the length of the spacer, the weldments being shown as 32 in FIG. 3. Although the seam formed by the overlapping portions 28, 30 is shown as being centrally located between the sidewalls 20, it will be understood that position of the seam may vary as desired between the side walls.

It will be understood that stainless steel sheeting having a thickness of 0.005 inches is quite springy. During the spacer forming process, it is difficult to exactly and precisely align the inner wall portions 22, 24 with one another; although these portions 22, 24 desirably are precisely coplanar, in practice they are often slightly out of planar alignment with one another by a distance (measured normal to the wall portions 22, 24) that is greater than the thickness of these portions. By providing edge portions 28, 30 that contact each other in surface-to-surface contact when urged together during the welding operation, a strong, crush-resistant joint is formed with great accuracy and reproducibility. By spacing the weldments 32 from one another along the edge portions 28, 30, there are thus provided tiny openings in the spaces between the weldments and between the confronting surfaces 34, 36 of the respective overlapping edge portions 28, 30, enabling gaseous communication of the interpane space with the interior 26 of the spacer but restraining passage of even tiny particles of desiccant or other particulate material through the openings from within the spacer to the interpane space. The edge portions 28, 30 preferably overlap each other by a distance of at least 0.04 inches, thereby providing a path length of at least 0.04 inches that must be traversed by a particle in order to escape from the interior of the spacer into the interpane space. The openings may have a width (between the weldments) of preferably not greater than 0.02 inches, and the distance between the overlapping edge portions between weldments commonly will not exceed about 0.001 inches.

Referring again to FIG. 2, elongated sealing ribbons 38 of polyisobutylene or the like adhere the spacer side walls 20 to confronting surfaces 11 of the glass panes. The sealing ribbons, which are common to each of the embodiments depicted in the drawing, preferably are made of a polymeric rubber such as polyisobutylene. The ribbons 38 desirably are employed in a thickness not greater than about 0.015 inches, and are sufficiently resilient to provide little resistance to slight pivoting movement of the glass panes toward or away from one another. In this manner, the spacer of the invention provides simply supported boundary conditions (as opposed to clamped boundary conditions) for the individual glass panes.

Referring again to FIG. 2, the interior 26 of the spacer is substantially filled with a crush-resistant, particulate desiccant composition, the particles of which are designated 42 in the drawing. For clarity, only a portion of the interior 26 is shown in FIG. 2 and in the other figures as being filled with the desiccant composition, but it will be understood that the desiccant composition substantially completely fills the interior 26 of the spacer and in any event extends from one of the spacer side walls 20 to the other. The resistance to crushing of the desiccant composition thus contributes to the side-to-side compressive strength of the spacer sealant assembly 14.

Although various desiccants may be employed, including particulate silica gel, molecular sieves (a refined version of naturally occurring zeolites) are particularly preferred.

Molecular sieves sold by W.R. Grace & Co. under its trade designation LD-3 are an appropriate desiccant; this material is available in the form of small spherical particles, 16–30 mesh, having pores approximately 3 Angstroms in diameter.

The particulate desiccant composition desirably comprises a sufficient amount of desiccant, such as spheroidal molecular sieves, to control the level of moisture in the interpane space as desired. In one embodiment, the interior 26 of the spacer is filled with spheroidal molecular sieves such as those described above. These spheroidal particles are desirable because they are generally dust-free, because they do not readily conduct heat energy, and because they are very efficient in removing water molecules from the interpane space. The molecular sieves 42 may be intermixed with, or diluted by, other particulate materials such as glass beads, care being taken to select materials that do not themselves give off contaminants that would adversely affect the glass pane surfaces that confront one another across the interpane space. The particulate composition received in the spacer interior and comprising desiccant, glass-beads or other materials, desirably is quite insulative, that is, its bulk coefficient of thermal conductivity (that is, the thermal conductivity of the composition when packed together) is less than that of the sealing ribbons 38 or other polymeric sealant employed between the spacer and the glass panes. The coefficient of thermal conductivity of the particulate composition preferably is not greater than 1, more preferably not greater than 0.5, and most preferably not greater than 0.2 Btu/hr $ft^2$ (°F.).

During fabrication of the spacer shown in FIG. 2, it is generally desired to first form the spacer with weldments 32, and thereafter pour or otherwise convey, as by an air stream, the particulate desiccant composition into the interior of the spacer. The individual particles of the particulate desiccant composition thus are free to arrange themselves with respect to other particles so that a reasonably high packing density is achieved. The particulate mass is confined by the interior walls of the spacer and, when closely packed, provides additional side-to-side crush resistance across the width of the spacer. In a less desired embodiment, the particulate desiccant composition may be initially formed as an insertable stick having a cross section similar to the interior cross section of the spacer, and the stick, as a unit, may be inserted into the spacer during fabrication.

Especially desired for the particulate desiccant composition are particles which, when crushed, do not produce a fine powder. Particulate desiccant compositions having this property may be poured into long spacer lengths, and the spacer itself may thereafter be bent at appropriate angles to fit a particular insulating glass unit shape and size. The particulate desiccant composition in the area of the bends undergoes some crushing during the bending procedure. It will be understood that the desiccant composition, even when the particles thereof are packed together, contains a substantial void volume to receive particle fragments produced when the particles are crushed during bending. If desired, plugs may be employed within the spacer length to prevent the particulate desiccant from settling away from those segments that will be subject to bending.

It will also be understood that the entire spacer that extends about the periphery of an insulating glass unit of the invention need not be filled with a particulate desiccant composition. The desiccant composition may be employed in segments along the length of the spacer as may be needed to increase the overall compressive strength of the spacer. Moreover, the particulate desiccant composition may be employed in some areas of the spacer, and other particulate materials which when packed into the spacer provide increased compressive strength may be employed in other spacer areas.

Figure 4:
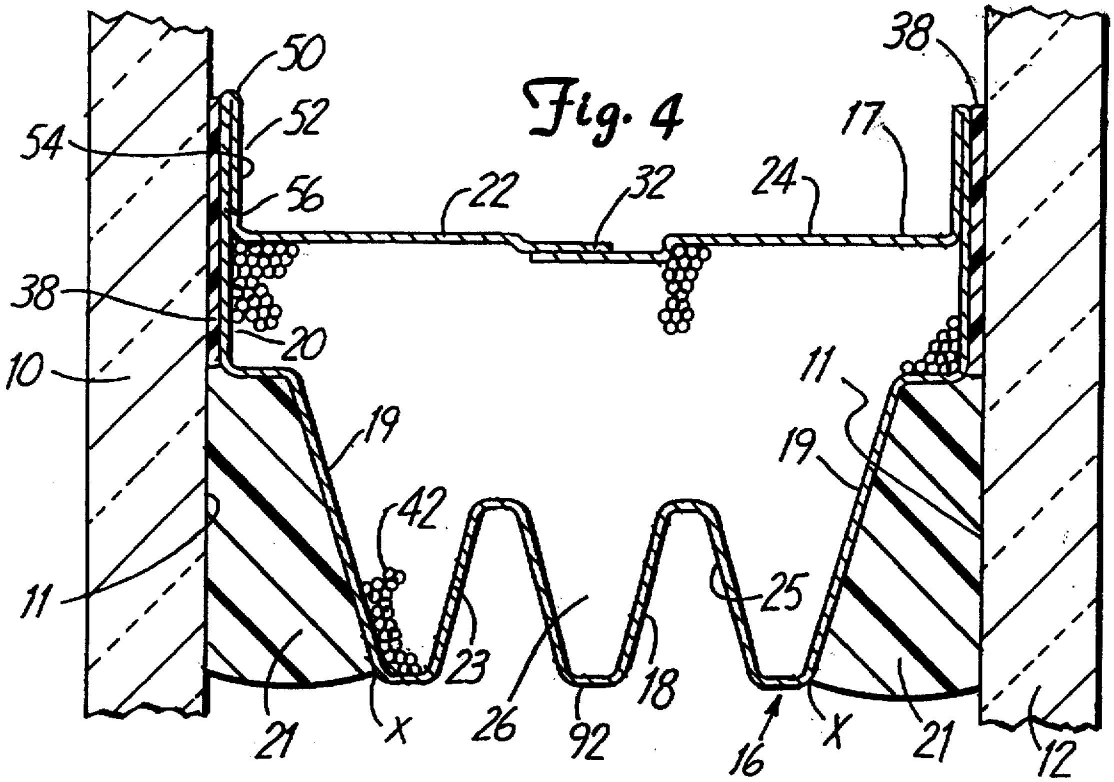
FIG. 4 is a cross-sectional view of the edge of an insulating glass assembly showing the shape and placement of a spacer.
Figure 5:
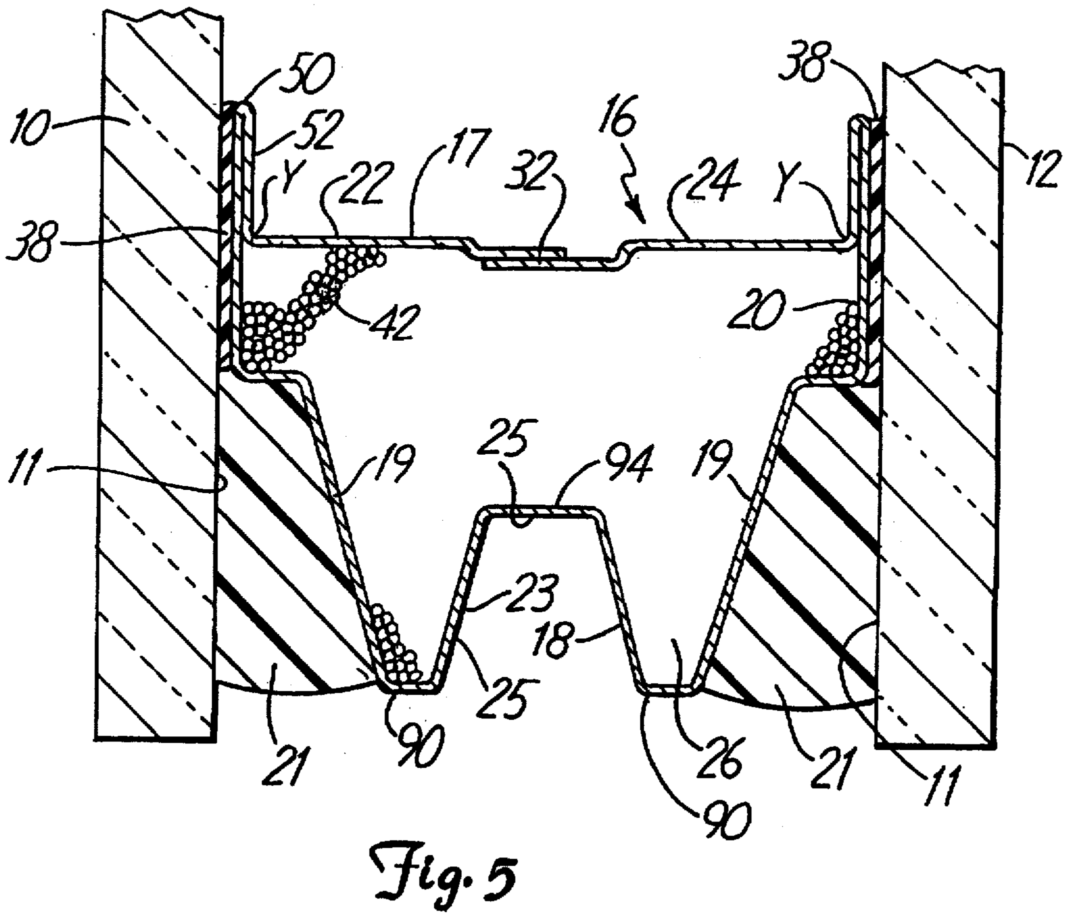
FIG. 5 is a cross-sectional view of an edge portion of an insulating glass unit of the invention showing a modified spacer element.

FIGS. 4 and 5 depict spacers of stainless steel similar to the spacer 16 described with reference to FIGS. 2 and 3, and the same reference numbers are employed to designate similar elements. In the embodiment of FIGS. 4 and 5, however, each of the side walls 20 extends inwardly (upwardly in FIG. 4) of the interpane space and is then doubled back upon itself as shown at 50, the doubled back wall sections 52 lying substantially parallel to the side walls 20 and being bent toward one another to form inner wall portions 22, 24 which themselves terminate in generally edge portions 28, 30, as described earlier with reference to FIGS. 2 and 3. The walls 52 are closely adjacent the respective side walls 20, and these walls have respective confronting surfaces 54, 56 which preferably engage one another to provide further side-to-side compressive strength. For clarity, certain of the drawing figures show the walls 20 as being spaced slightly from the walls 52, but it will be understood that contact between these walls is desired. The walls 52 may be provided with tiny slots or Other perforations (not shown) to communicate the desiccant-containing interior of the spacer with the interpane space.

Lengths of the spacer having the configuration shown in FIGS. 4 and 5 are particularly adaptable to being bent at right angles so as to conform to corners of glass panes forming an insulating glass unit, as is described in greater detail below. The inwardly (upwardly in FIG. 4) extending portions of the side wall and the walls 52 being sufficiently flexible as to enable them to readily deform in a controlled manner during a corner bending process. It will be understood that the spacer of FIG. 4, as with the previously described spacer desirably is made of stainless steel having a thickness of not greater than about 0.005 inches, is provided desirably with an internal particulate desiccant composition 42 which contributes compressive strength to the spacer, and is employed between the peripheral portions of spaced glass panes in the manner described above in connection with FIG. 2. Moreover, the outer wall 18, which is shown in cross-section as generally "U" shaped in FIG. 2 and "M" or "W" shaped in FIG. 5, may have an even greater serpentine shape in cross-section as typified in FIG. 4 to increase the length of the "thermal bridge" provided by the wall 18 between the two glass panes and hence increase the resistance to heat flow.

As shown in FIGS. 2, 4 and 5, the outer wall 18 includes portions 19 that extend outwardly (downwardly in these figures) divergently from the respective glass panes to form outwardly open gaps bounded by the glass pane surfaces 11 and the outer wall portions 19, these gaps being substantially filled with a polymeric sealant 21 such as a silicone rubber during the glass unit manufacturing process. The polymeric sealant does not extend completely from one glass pane to the other, however. Rather, the outer wall 18 has an intermediate portion 23, desirably approximately equidistant from the pane surfaces 11, that is free of sealant on both sides, this portion having a distance $d_1$ measured along its outer surface 25 between the glass panes. That is, if the outer wall 18 of the spacer shown in FIG. 4 were to be stretched-horizontally into a flat configuration, the distance measured normal to the planes the glass panes between points "x" would be $d_1$, the points "x" representing the boundaries of the polymeric sealant 21. The sealant-free portion 23 of the outer wall 18 may, of course, have a thin protective polymeric coating which does not increase the thermal conductivity measured parallel to wall by more than about 20%.

Sealant-free portion 23 desirably is of approximately uniform width substantially throughout its length, and preferably extends substantially completely about the periphery of the glass unit.

The interior wall 17 extending between the side walls 20 and typified in FIGS. 2, 4 and 5 as being formed by portions 22 and 24 has a distance $d_2$ along its surface between the side walls 20, this distance being typified in FIG. 5 as extending between points "y". Because the outer wall 18 is desirably serpentine in cross section, the distance $d_1$ commonly is greater than the distance $d_2$, although for certain configurations of the outer wall, such as shown in FIG. 2, and for various widths of the polymeric sealant 21, the distance $d_1$ will be smaller than $d_2$. The ratio $d_1/d_2$ should be at least 0.2, preferably is at least 0.5, more preferably is at least 0.9 and most preferably is at least 1.2, the preferred range being 0.9–1.4.

Figure 6:
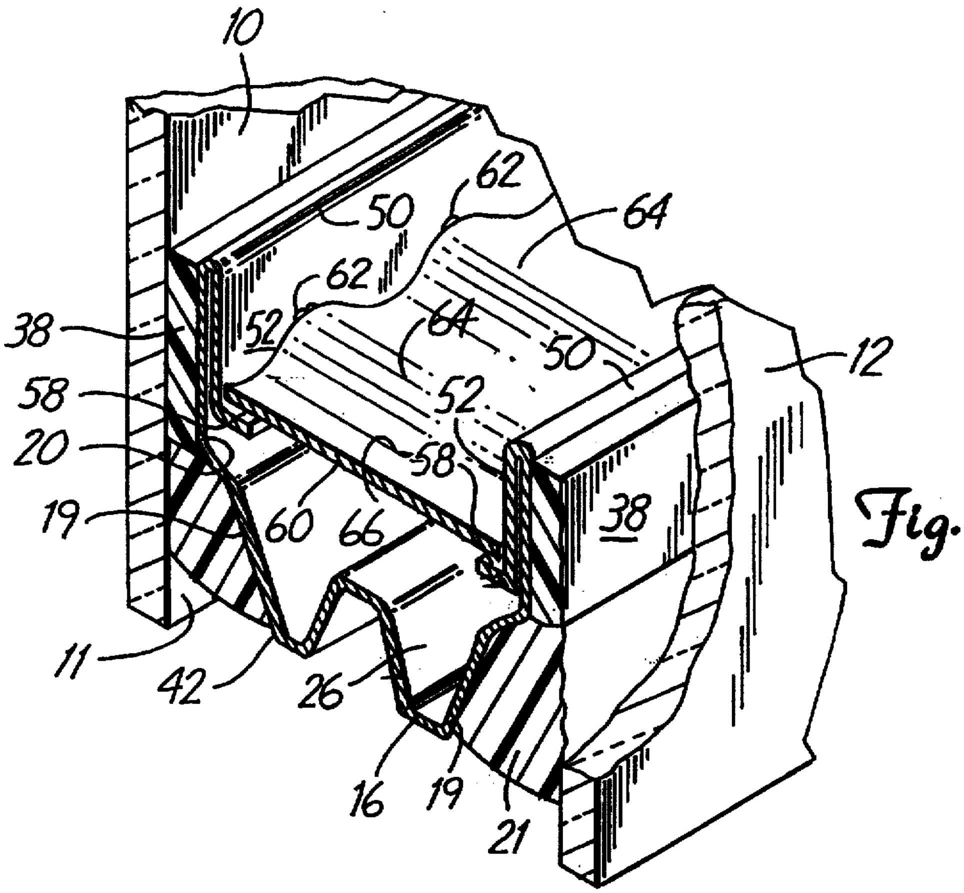
FIG. 6 is a broken-away, perspective view of an insulating glass unit of the invention showing a further modified spacer element.

Referring to FIG. 6, (wherein, again, the same numerals designate structure similar to that of previously described figures), the spacer 16 is similar to the spacers described above in connection with FIGS. 2 and 3, and FIG. 4, with several notable exceptions. In a manner similar to the prior figures, the spacer 16 is carried between spaced glass panes 10, 12 and has side walls 20 that are adhered to confronting surfaces of the glass panes by means of sealing ribbons 38.

The side walls 20 of spacer 16 extend, in a manner similar to the spacer shown in FIG. 4, generally inwardly of the interpane space (upwardly in FIG. 6) and then are bent immediately back upon themselves at 50 as in FIG. 4 to form wall portions 52 that extend parallel to the side walls 20. The wall sections 52 terminate in inwardly turned lips 58 that extend toward one another a short distance across the interior 26 of the spacer 16. An inner wall, designated generally 60, faces the interpane space and rests along its edges on the inwardly turned lips 58 and is welded, at points 62, to the walls 52. The inner wall 60 is corrugated, with the corrugations running from side to side of the spacer shown in FIG. 6. Crests of the sinusoidal corregations as they appear in FIG. 6 are designated as 64 and the troughs as 66.

Figure 7:
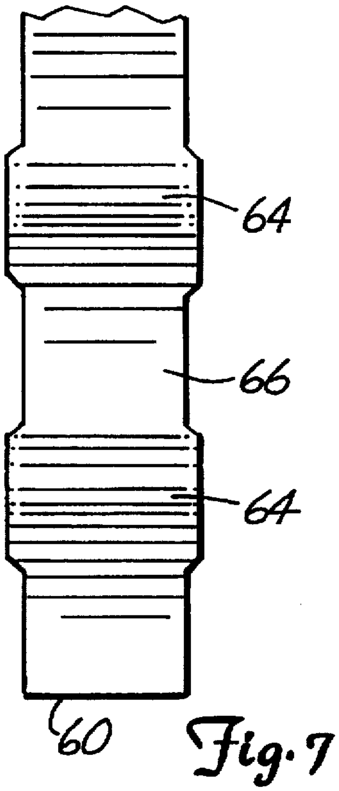
FIG. 7 is a broken-away plan view of a part of the spacer element shown in FIG. 6.
Figure 8:
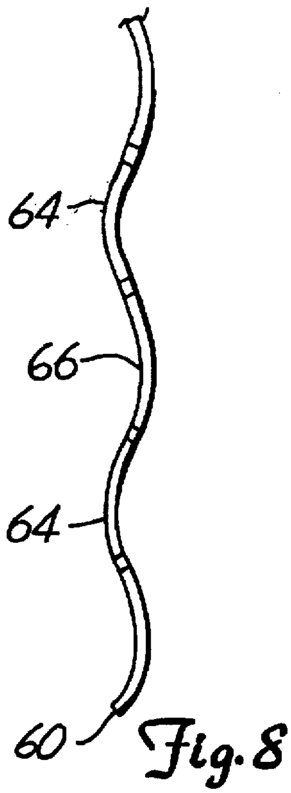
FIG. 8 is a side, broken-away view of the spacer element shown in FIG. 7.

The inner wall 60 is shown in greater detail in FIGS. 7 and 8, the wall being fabricated from a length of stainless steel or other material so that the wall is provided with corrugations having crests 64 and troughs 66. With reference to FIG. 7, it will be noted that the crest portions-in one embodiment are somewhat wider than are the trough portions, and it is desirably the edges of the crest portions 64 that are welded at points 62 to the walls 52. The narrower portions of the inner wall that appear generally at the troughs 66 permit small gaps that provide communication between the interpane space and the interior 26 of the spacer. If desired, however, the width of the inner wall may be uniform along its length. The spacer 16 and its inner wall 60, as shown in. FIGS. 6–8, desirably all are fabricated from stainless steel sheeting having a thickness less than about 0.005 inches. The corrugations can be of any convenient size, but desirably have a height from trough to crest of about 0.020 inches or more. As will be understood, the corrugations formed in the inner wall provide the wall with increased side-to-side stiffness, increasing the resistance of the spacer to crushing. The difference in width between the wide and narrow portions of the inner wall 60, if any, may be on the order of 0.014–0.020 inches.

As with the embodiments previously described, a particulate desiccant composition may be employed within the spacer of FIGS. 6–8 to provide additional lateral compressive strength to the spacer.

The spacers of the invention, as mentioned earlier, desirably are made of stainless steel or of other strong metal such as titanium or magnesium alloys, stainless steel being preferred. The thickness of the metal spacer desirably is not greater-than about 0.005 inches, and preferably is not greater than about 0.0035 inches, and desirably is about 0.005 inches. Thus, the instant invention, in a preferred embodiment, employs a stainless steel metal spacer that is extremely thin and hence conducts heat from one side wall to the other only very poorly. Nonetheless, by virtue of including a particulate desiccant composition, the crush resistance of the spacer is increased, with the result that the spacer is capable of withstanding without crushing the stresses commonly involved in transportation of glass units of the invention and installation of the units in suitable frames. It is particularly desirable to employ a packed particulate desiccant composition in the spacers of the invention of FIGS. 2–4 to increase the lateral resistance of the spacers to crushing loads. The use of a structurally supportive particulate desiccant composition when a corregated inner wall is employed, as shown in the embodiment of FIGS. 6–8, is less important inasmuch as the corrugations themselves provide additional stiffness and resistance to crushing.

Figure 9A:
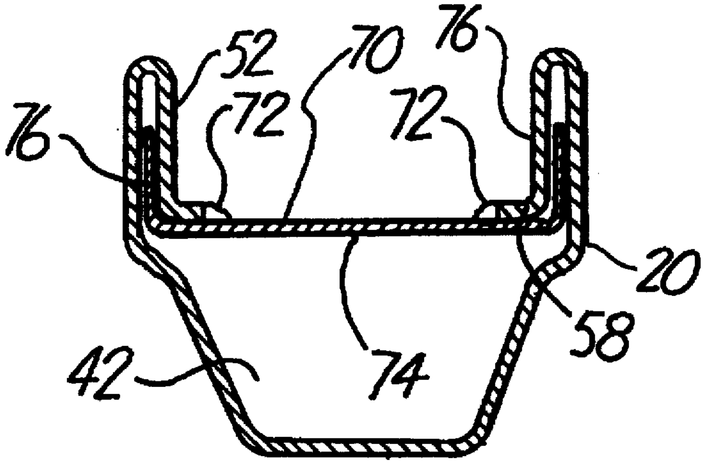
FIG. 9(*a*) is a cross-sectional view of yet another spacer element embodiment.
Figure 9B:
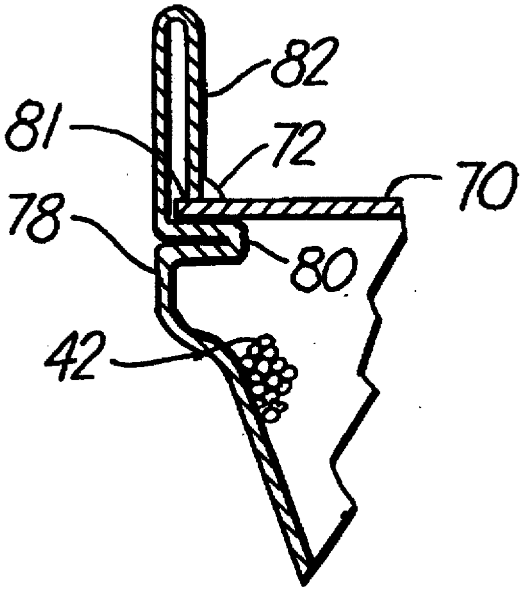
Figure 9C:
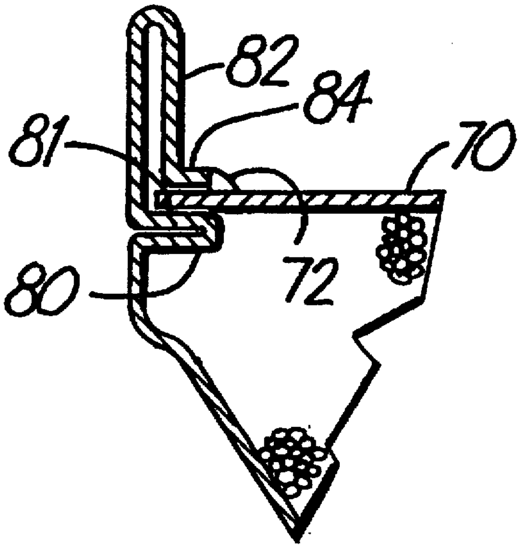

FIGS. 9(*a*), (*b*) and (*c*) show modifications of certain of the previously described spacers. The spacer 16 includes a body portion having parallel spaced sidewalls 20 that are doubled back upon themselves as shown in FIG. 5 to form wall portions 52, the latter terminating in inwardly turned lips 58 that extend toward one another a short distance across the interior of the spacer. A flat inner wall 70, faces the interpane space and rests along its edges on the inwardly turned tips 58 and is welded, at 72, to the walls 52. The weldment 72 may be spaced along the length of the inner wall 60 so as to provide small air spaces permitting the interior of the spacer to communicate with the interpane space. As needed, the inner wall 70 may be provided with narrow slots through its thickness, for the same purpose.

In FIG. 9(*a*), the inner wall 60 of FIG. 6 has been replaced with an inner wall 70 having a straight portion 74 and a pair of upwardly turned edges 76 which extend within the recesses formed by the doubled back sidewalls 52. Weldments 72 are formed at the edge of the inwardly turned lips 58 and the upper surface of the inner wall portion 74. It will be understood that the embodiment shown in FIG. 9(*a*) can be made by separately forming the two metal pieces as shown, and then sliding the inner wall 70 longitudinally of the body of the spacer to obtain the configuration shown in that figure. Alternatively, the inner wall portion 70 may be located as shown with respect to the sidewalls 20 prior to bending the sidewalls back upon themselves to form portions 52.

The modification shown in FIG. 9(*b*) provides a sidewall 78 that is provided with a lateral double-backed portion 80 that provides a lateral shelf 81 upon which may rest the inner wall 70 the edges of the inner wall 70 may extend beneath the double-backed portion 82, the sidewalls being welded, as in FIG. 9(*a*), to the inner wall 70.

FIG. 9(*c*) depicts an embodiment similar to 9(*b*) except that the doubled-back portion 82 of the sidewall has an inwardly turned lip 84 at its lower end, similar to the lip. 58 shown in FIG. 8. The inner wall 70, again, is welded to the inwardly turned lip 84 at points 72 which are spaced along the length of the spacer. The embodiments of FIGS. 9(*b*) and 9(*c*) may be formed as described above in connection with FIG. 9(*a*); that is, the inner wall 70 may be inserted from the end of the spacer, or may simply be laid upon the shoulder formed by the inwardly turned lip 80 following which the doubled back sidewall portion 82 is formed.

The corners of the spacers of the invention—that is, the points at which the spacers undergo a 90 degree change of direction as the spacer extends about the periphery of an insulating glass unit—are readily formed; desirably, each spacer is formed of a single length of material which is provided with three or four right angle small radius bends to provide a rectangular shape suitably sized for use with a rectangular window unit. The ends of the spacer length desirably are positioned along the top run of the spacer, that is, that run of the spacer which would form the top of the glazed glass unit.

Figure 10:
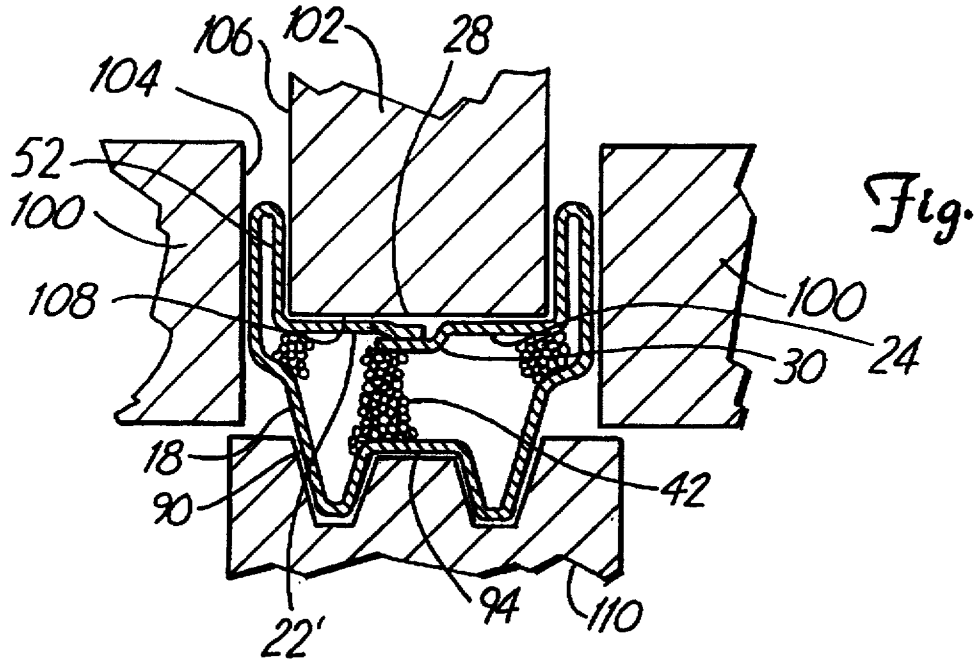
FIG. 10 is a cross-sectional view of the spacer of FIG. 5, taken at a location along its length and showing bending elements used in forming a right-angled corner having a short bend radius.

The corner forming operation is depicted in FIG. 10 and is discussed in reference to the spacers of FIG. 5. The spacer is provided with an outer wall 18, that wall having two outwardly extending lobes 90. In FIG. 5, the generally flat central outer wall portion 94 has taken the place of the central lobe 92 of FIG. 4. Although modification of the corner portions of the spacer in this manner is desired, the bottom wall 18 of spacers of the invention can be of any desirable configuration, such as that shown in FIGS. 2, 4, 5 and 9(*a*). The corner portion of the spacer length, as shown in FIG. 10, is placed within a bending die having opposed side portions 100 and an insert 102 between the side portions and adapted to contact and support the inner wall portions 22, 24 of the spacer. The die portions 100, 102 have facing surfaces 104, 106, respectively that are spaced from one another and within which is received the double backed wall portion 52. Shown at 110 is a bending die that has an upper surface generally shaped to accommodate in surface-to-surface contact the shape of the outer wall 18 of the Spacer which contains the lobes 90. The interior of the spacer, of course, is packed with a particulate desiccant or other crush-resistant filling material designated as 42. The forming die 110 is moved in a curved motion along the length of the spacer portion (perpendicular to the plane of the paper in FIG. 10) to form a right angled bend in the spacer, the die portions 100, 102 maintaining the integrity and dimensions of the side walls 52 and inner wall portion 22, 24. As the bending process takes place, the malleable walls of the spacer—preferably made of thin walled stainless steel as noted above—deform to accomodate the bend, and are prevented from collapsing upon one another because of the presence of the particulate desiccant or other material within the interior of the spacer. The bending radius of the interior wall may be on the order of ⅜ inches.

During bending of the corners of the spacer, the crushing forces that are placed on the desiccant or other particulate material may be substantial, and to the extent that a small amount of crushing or powdering of the desiccant occurs, it is important that the desiccant not be permitted to escape into the interpane space of the window unit. The sealing design shown in FIG. 3 has given excellent results in that the tiny openings that are formed during the welding process are too small to pass even very small particles. If desired, of course, the seam in FIG. 3 may be welded on a continuous basis in the vicinity of the bend to seal them together. In this manner, desiccant or other particulate material within the hollow interior of the spacer at its corner portions may be sealed from escaping into the interpane space. If desired, a filler that does not break into small particles when crushed may be employed within the corner portions of the spacer, such as plastic beads, strong but bendable plastic (eg., polyurethane) foams, etc.

The die portion 102 may, if desired, be provided with a bottom surface 108 that itself is corrugated or serrated or otherwise shaped to place regularly spaced ridges of a pre-determined and asthetically acceptable design in the visible corner portion of the spacer.

Figure 11:
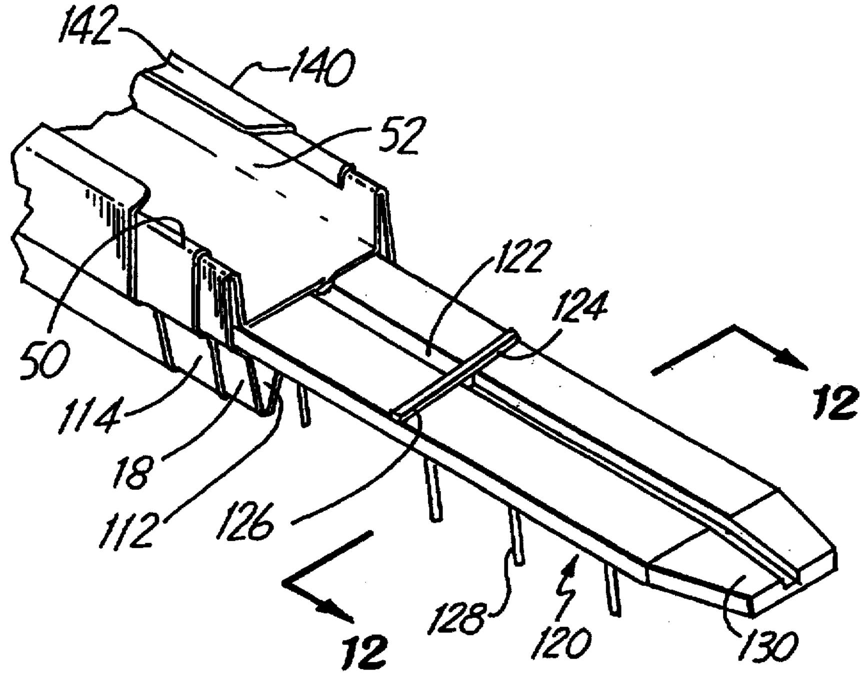
FIG. 11 is a broken-away assembly view showing a joint for a spacer of the invention.
Figure 12:
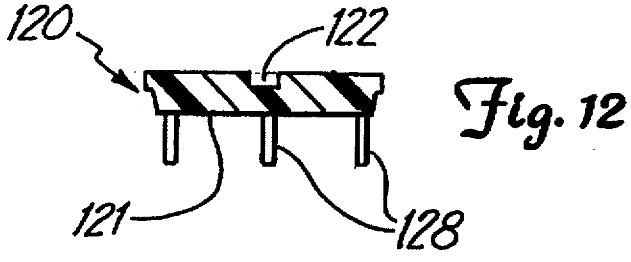
FIG. 12 is a cross-sectional view taken along line 11—11 of FIG. 10.

Once a spacer of the invention has been formed, as indicated, into a generally rectangular shape to fit the desired window unit, the free ends of the spacer are brought together in abutting relationship and are secured in place. FIGS. 11 and 12 depict one manner in which this process may be carried out. The spacer configuration shown in FIG. 11 is that of FIG. 4. Within the open end 112 of the spacer 16 is received a key insert designated generally 120. The insert, desirably made of an ABS plastic or other material resistent to heat flow, is generally rectangular in cross-section and has an elongated slot 122 along its surface that faces the inter-pane space. The slot is sized and shaped so as to receive the overlapped edge portions 28, 30 described in connection with FIG. 4. Approximately a third of the length of the key 120 is shown protruding from the end of the spacer 16, the key having identical ends. Desirably, the body of the key is interrupted at 124, the spacer here having transverse wall sections 126 defining its midpoint and ensuring that half of the length of the key will be received in each spacer end. Depending downwardly from the bottom surface 121 of the key are a series of spaced, resilient fingers 128 of sufficient length so that they contact the end edges of the spacer (that is, the edges of the outer wall 18) and become bent over as the spacer is inserted into the spacer end, thus locking the key within the spacer end. The end 130 of the key may be tapered as desired to facilitate easy insertion into the end of the spacer.

The joint thus formed between ends of the spacer may be covered by a clip comprising a short length 140 (FIG. 10) of a malleable, gas impermeable sheeting such as stainless steel or other metallic sheeting which can be bent, and which desirably is pre-bent, into a shape substantially identical to the body portion 18 and side wall portion 20 of the spacer of FIG. 4, the clip desirably having inwardly turned lips 142 which are received over the top bends 50 of the spacer of FIG. 4. The clip 140 is sized to fit snugly around the exterior of the spacer 16, and is positioned over the butt joint between the ends of the spacer so that the lips 142 may be crimped downwardly tightly against the side walls 52 of the spacer. The internal dimensions of the clip are substantially identical to the outer dimensions of the spacer 16 so that when the lips 142 are crimped in place, the portion 140 closely hugs the contours of the spacer. In the manner thus described, a butt joint may be quickly formed between the opposing ends of a spacer of the invention, and the butt joints in this manner can be made scarsely noticeable to the eye.

Preferably, a sealing compound 114 such as polyisobutylene may be placed around the exterior wall surfaces of the abutting spacer ends to form a tight seal between those ends and the overlying clip 140. The sealing compound 114 serves to adhere the clip to the exterior wall surfaces of the abutting spacer ends and serves to seal the outer wall and render it substantially impermeable to water vapor and other gases. The sealing compound may be supplied as a thin (e.g., 0.015 inch) layer upon a silicone coated release liner, and may be applied while supported by the liner to the side and outer walls of the butt-joined spacer adjacent the joint, following which the liner may be simply removed and the clip 140 applied, the latter squeezing the compound between it and the confronting walls of the spacer as shown in FIG. 11. If desired, the sealing compound may be supplied as a thin layer upon a malleable, substantially gas-impermeable sheet such as aluminum foil, and the latter can be formed to tightly engage the outer surface of the spacer across the butt joint, the sealing compound thus being sandwiched between the foil and the walls of the spacer. The foil, in this manner, serves itself as the clip.

While a preferred embodiment of the present invention has been described, it should be understood that various changes, adaptations and modifications may be made therein without departing from the spirit of the invention and the scope of the appended claims.

I claim:

1. A method of forming a right-angled rounded corner in a straight length of a stainless steel tubular spacer having deformable walls while exteriorly supporting said walls and adapted for use in an insulating glass unit, the method comprising packing the interior of the straight portion with crush-resistant particles, and then bending the spacer length into a right angled rounded corner of a thickness not greater than about 0.005 inches, the particles preventing the walls of the spacer from collapsing during the bending operation.

2. The method of claim 1 wherein the length of spacer has opposed, generally flat side walls having exterior surfaces lying in parallel, spaced planes for attachment to confronting surfaces of a pair of spaced, parallel glass panes, the method including the step of supporting the side walls against movement out of the parallel, spaced planes during the bending operation.

3. The method of claim 2 wherein the spacer includes a generally flat surface between its side walls and forming an interior surface of the right angle bend, the method including the step of supporting the flat surface against uncontrolled buckling during the bending operation.

4. A method of forming a right-angled rounded corner in a straight length of a spacer having a tubular structure formed of metal, the spacer having deformable walls of a thickness not greater than about 0.005 inches and being adapted for use in an insulating glass unit, the method comprising packing the interior of the straight portion with crush-resistant particles, and then bending the spacer length into a right-angled rounded corner while exteriorly supporting said walls, the particles preventing the walls of the spacer from collapsing during the bending operation.

5. The method of claim 4 wherein the length of spacer has opposed, generally flat side walls having exterior surfaces lying in parallel, spaced planes for attachment to confronting surfaces of a pair of spaced, parallel glass panes, the method including the step of supporting the spacer length in a bending die having opposed side portions supporting the side walls against movement out of said parallel, spaced planes during the bending operation.

6. The method of claim 5 wherein said spacer includes spaced interior and exterior walls between the side walls to form with the side walls said tubular structure, the side walls each including a portion extending outwardly from the interior wall and a doubled back portion and the interior wall extending between and joining said doubled back portions, the method including the step of positioning a supporting insert between said doubled-back portions such that said outwardly extending portions and doubled-back portions are positioned between and in contact with the insert and the opposed side portions of the bending die to support the same during a bending operation.

7. The method of claim 6 wherein said exterior wall of the spacer has a predetermined cross-sectional configuration, the method including the step of positioning a forming die against the exterior wall, the forming die having a surface configured to accommodate in surface-to-surface contact said exterior wall, and moving said forming die along said length of spacer in a curved motion to form said right-angled bend.

* * * * *

UNITED STATES PATENT AND TRADEMARK OFFICE
CERTIFICATE OF CORRECTION

PATENT NO. : 5,705,010

DATED : 6 January 1998

INVENTOR(S) : James E. Larsen

It is certified that error appears in the above-identified patent and that said Letters Patent are hereby corrected as shown below:

Col 1, Line 21, delete "thermals" and insert –thermal–.
Col 7, Line 22, delete "Other" and insert --other -.
Col 7, Line 62, after "planes" insert --of--.
Col 8, Line 45, delete "portions-in" and insert --portions in--.
Col 8, Line 52, delete "as shown in." and insert --as shown in--.
Col 9, Line 5, delete "greater-than" and insert --greater than--.
Col 9, Line 61, after "lip" delete "."
Col 10, Line 29, delete "double backed" and insert "double-backed".

Signed and Sealed this

Twenty-fourth Day of October, 2000

*Attest:*

Q. TODD DICKINSON

*Attesting Officer*

*Director of Patents and Trademarks*